(12) United States Patent
Venkatesh et al.

(10) Patent No.: US 10,983,819 B2
(45) Date of Patent: Apr. 20, 2021

(54) DYNAMIC PROVISIONING AND DELIVERY OF VIRTUAL APPLICATIONS

(71) Applicant: VMWARE, INC., Palo Alto, CA (US)

(72) Inventors: Revanur Venkatesh, Bangalore (IN); Siva Praveen Mummaneni, Bangalore (IN); Rahul Kumar, Bangalore (IN); Manigandan Bakthavatchalam, Bangalore (IN)

(73) Assignee: VMware, Inc., Palo Alto, CA (US)

( * ) Notice: Subject to any disclaimer, the term of this patent is extended or adjusted under 35 U.S.C. 154(b) by 231 days.

(21) Appl. No.: 16/127,252

(22) Filed: Sep. 11, 2018

(65) Prior Publication Data

US 2020/0026540 A1 Jan. 23, 2020

(30) Foreign Application Priority Data

Jul. 18, 2018 (IN) .............................. 201841026869

(51) Int. Cl.
*G06F 9/455* (2018.01)
*G06F 9/50* (2006.01)
*G06F 16/188* (2019.01)

(52) U.S. Cl.
CPC ........ *G06F 9/45558* (2013.01); *G06F 9/5077* (2013.01); *G06F 16/188* (2019.01); *G06F 2009/45562* (2013.01)

(58) Field of Classification Search
CPC ......... G06F 9/45558–52; G06F 9/5077; G06F 2009/45562
See application file for complete search history.

(56) References Cited

U.S. PATENT DOCUMENTS

| 9,766,915 B1* | 9/2017 | Emelyanov | G06F 9/5077 |
| 2014/0075434 A1* | 3/2014 | Assuncao | G06F 9/455 718/1 |
| 2014/0282538 A1* | 9/2014 | Conover | G06F 9/45558 718/1 |
| 2015/0074126 A1* | 3/2015 | Choudhary | G06F 9/468 707/754 |
| 2015/0227355 A1* | 8/2015 | Tripoli | H04L 67/1095 717/175 |

(Continued)

OTHER PUBLICATIONS

FSLogix Apps for Citrix AppDisk Reference Architecture FSLogix (Year: 2015).*

(Continued)

*Primary Examiner* — Emerson C Puente
*Assistant Examiner* — Paul V Mills
(74) *Attorney, Agent, or Firm* — Patterson + Sheridan, LLP

(57) ABSTRACT

The disclosure provides an approach for mounting a virtual disk to a virtual computing instance (VCI). The method comprises obtaining a set of required applications for each VCI in a set of VCIs. The method comprises obtaining constraints of each VCI in the set of VCIs. The method further comprises determining pair-wise application overlap between each pair of VCIs of the set of VCI, wherein the overlap complies with constraints of the two VCIs for which the overlap is determined. The method also comprises placing applications of at least one of the application overlaps into a virtual disk file, associating the virtual disk with the virtual disk file, and mounting the virtual disk to a first VCI of the set of VCIs.

21 Claims, 6 Drawing Sheets

(56) References Cited

U.S. PATENT DOCUMENTS

2017/0220364 A1* 8/2017 Kadioglu ............... G06F 8/313
2018/0210748 A1* 7/2018 Kakaraparthi ...... G06F 9/45558

OTHER PUBLICATIONS

"App Volumes limit" VMWare community forum post https://communities.vmware.com/message/2581370#2581370 (Year: 2016).*
Learning VMware App Volumes Peter von Oven Selected pages (Year: 2016).*
VMware App Volumes Design Methodology David Ball Retrieved: https://ballblog.net/2015/04/14/vmware-app-volumes-design-methodology/ (Year: 2015).*
VMware App Volumes Technical FAQ—VMware App vols. 2.7 VMware, Inc. Item No. VMW-WP-APPVOLUMESTECHFAQ-USLET-20150819-WEB (Year: 2015).*
Typical Virtual Appliances: An optimized mechanism for virtual appliances provisioning and management Tianle Zhang, Zhihui Du, Yinong Chen, Xiang Ji, Xiaoying Wang (Year: 2011).*
VMDK File Format—https://en.wikipedia.org/wiki/VMDK.
VHD File Format—https://en.wikipedia.org/wiki/VHD_(file_format).

* cited by examiner

| VM | Max Apps per vDisk | Available Mounting Slots | Apps Yet to Be Mounted | 1, 4, 5, 6 | 0, 1, 2, 3, 9 | 4, 5, 7, 8, 9 | 3, 6, 8, 9 | 0, 2, 8, 9, 7 | vDisks to Mount |
|---|---|---|---|---|---|---|---|---|---|
| 116₁ | 3 | 2 | 1, 4, 5, 6 | 1, 4, 5, 6 | 1 | 4, 5 | 6 | [] | - |
| 116₂ | 2 | 3 | 0, 1, 2, 3, 9 | | 0, 1, 2, 3, 9 | 9 | 3, 9 | 0, 2, 9 | - |
| 116₃ | 3 | 2 | 4, 5, 7, 8, 9 | | | 4, 5, 7, 8, 9 | 8, 9 | 7, 8, 9 | - |
| 116₄ | 3 | 2 | 3, 6, 8, 9 | | | | 3, 6, 8, 9 | 8, 9 | - |
| 116₅ | 3 | 4 | 0, 2, 8, 9, 7 | | | | | 0, 2, 8, 9, 7 | - |

FIG. 3A

| VM | Max Apps per vDisk | Available Mounting Slots | Apps Yet to Be Mounted | 1, 4, 5, 6 | 0, 1, 2, 3, 9 | 4, 5 | 3, 6 | 0, 2 | vDisks to Mount |
|---|---|---|---|---|---|---|---|---|---|
| $116_1$ | 3 | 2 | 1, 4, 5, 6 | 1, 4, 5, 6 | 1 | 4, 5 | 6 | 0 | - |
| $116_2$ | 2 | 3 | 0, 1, 2, 3, 9 | | 0, 1, 2, 3, 9 | 0 | 3 | 0, 2 | - |
| $116_3$ | 3 | 1 | 4, 5 | | | 4, 5 | 0 | 0 | (7, 8, 9) |
| $116_4$ | 3 | 1 | 3, 6 | | | | 3, 6 | 0 | (7, 8, 9) |
| $116_5$ | 3 | 3 | 0, 2 | | | | | 0, 2 | (7, 8, 9) |

FIG. 3B

| VM | Max Apps per vDisk | Available Mounting Slots | Apps Yet to Be Mounted | 1, 6 | 0, 1, 2, 3, 9 | 0 | 0 | 0, 2 | vDisks to Mount |
|---|---|---|---|---|---|---|---|---|---|
| $116_1$ | 3 | 1 | 1, 6 | 1, 4, 5, 6 | 1 | 0 | 0 | 0 | (4, 5) |
| $116_2$ | 2 | 3 | 0, 1, 2, 3, 9 | | 0, 1, 2, 3, 9 | 0 | 0 | 0, 2 | - |
| $116_3$ | 3 | 0 | 0 | | | 0 | 0 | 0 | (7, 8, 9), (4, 5) |
| $116_4$ | 3 | 0 | 0 | | | | 0 | 0 | (7, 8, 9), (3, 6) |
| $116_5$ | 3 | 3 | 0, 2 | | | | | 0, 2 | (7, 8, 9) |

FIG. 3C

| VM | Max Apps per vDisk | Available Mounting Slots | Apps Yet to Be Mounted | 0 | 0, 1, 2, 3, 9 | 0 | 0 | 0, 2 | vDisks to Mount |
|---|---|---|---|---|---|---|---|---|---|
| $116_1$ | 3 | 0 | 0 | 0 | 0 | 0 | 0 | 0 | (4, 5), (1, 6) |
| $116_2$ | 2 | 3 | 0, 1, 2, 3, 9 | | 0, 1, 2, 3, 9 | 0 | 0 | 0, 2 | - |
| $116_3$ | 3 | 0 | 0 | | | 0 | 0 | 0 | (7, 8, 9), (4, 5) |
| $116_4$ | 3 | 0 | 0 | | | | 0 | 0 | (7, 8, 9), (3, 6) |
| $116_5$ | 3 | 3 | 0, 2 | | | | | 0, 2 | (7, 8, 9) |

FIG. 3D

| VM | Max Apps per vDisk | Available Mounting Slots | Apps Yet to Be Mounted | [] | 1, 3, 9 | [] | [] | [] | vDisks to Mount |
|---|---|---|---|---|---|---|---|---|---|
| 116₁ | 3 | 0 | [] | [] | [] | [] | [] | [] | (4, 5), (1, 6) |
| 116₂ | 2 | 2 | 1, 3, 9 | | 1, 3, 9 | [] | [] | [] | (0, 2) |
| 116₃ | 3 | 0 | [] | | | [] | [] | [] | (7, 8, 9), (4, 5) |
| 116₄ | 3 | 0 | [] | | | | [] | [] | (7, 8, 9), (3, 6) |
| 116₅ | 3 | 2 | [] | | | | | [] | (7, 8, 9), (0, 2) |

FIG. 3E

| VM | Max Apps per vDisk | Available Mounting Slots | Apps Yet to Be Mounted | [] | 9 | [] | [] | [] | vDisks to Mount |
|---|---|---|---|---|---|---|---|---|---|
| 116₁ | 3 | 0 | [] | [] | [] | [] | [] | [] | (4, 5), (1, 6) |
| 116₂ | 2 | 1 | 9 | | 9 | [] | [] | [] | (0, 2), (1, 3) |
| 116₃ | 3 | 0 | [] | | | [] | [] | [] | (7, 8, 9), (4, 5) |
| 116₄ | 3 | 0 | [] | | | | [] | [] | (7, 8, 9), (3, 6) |
| 116₅ | 3 | 2 | [] | | | | | [] | (7, 8, 9), (0, 2) |

FIG. 3F

| VM | Max Apps per vDisk | Available Mounting Slots | Apps Yet to Be Mounted | [] | [] | [] | [] | [] | vDisks to Mount |
|---|---|---|---|---|---|---|---|---|---|
| 116₁ | 3 | 0 | [] | [] | [] | [] | [] | [] | (4, 5), (1, 6) |
| 116₂ | 2 | 0 | [] | | | [] | [] | [] | (0, 2), (1, 3, 9) |
| 116₃ | 3 | 0 | [] | | | [] | [] | [] | (7, 8, 9), (4, 5) |
| 116₄ | 3 | 0 | [] | | | | [] | [] | (7, 8, 9), (3, 6) |
| 116₅ | 3 | 2 | [] | | | | | [] | (7, 8, 9), (0, 2) |

FIG. 3G

DYNAMIC PROVISIONING AND DELIVERY OF VIRTUAL APPLICATIONS

RELATED APPLICATIONS

Benefit is claimed under 35 U.S.C. 119(a)-(d) to Foreign Application Serial No. 201841026869 filed in India entitled "DYNAMIC PROVISIONING AND DELIVERY OF VIRTUAL APPLICATIONS", on Jul. 18, 2018, by VMware, Inc., which is herein incorporated in its entirety by reference for all purposes.

BACKGROUND

In a traditional application delivery model, a separate copy of an application is installed on physical disks of each computing device. In a data center with many computing devices, virtual application delivery systems can help to manage the complex task of provisioning applications to computing devices.

One type of virtual application delivery system involves applications stored on shared, read-only virtual disks. These shared virtual disks are placed in a storage system that is accessible over a network by the computing devices or that is local to a computing device. A server running a manager module configures the computing devices and mounts the virtual disks to computing devices, such as virtual machines, as read-only disks. As used herein, to "mount" a virtual disk to a computing device means to connect a virtual disk to the computing device so that data on the virtual disk is accessible to the computing device. To "mount" a virtual disk may include associating the virtual disk with a physical file (referred to herein as a "virtual disk file") stored on a storage medium. After mounting, the computing devices can then access and run the stored applications. The computing devices have an agent module. The agent module captures and redirects file-system calls to the applications on virtual disks, as needed. Accordingly, the stored applications can be virtually delivered to the computing devices instead of being individually installed locally at each computing device. One example of such a virtual application delivery system is App Volumes™ made commercially available from VMware, Inc. of Palo Alto, Calif.

The mounting procedure for such virtual application delivery systems takes time during boot of the computing device. To reduce latency during mounting, many applications are included on a single virtual disk that has one partition, and only one or a few such virtual disks then need to be mounted in order to access the applications.

SUMMARY

A method described herein provides for mounting a first virtual disk to a first virtual computing instance (VCI), the method comprising obtaining a set of required applications of the first VCI and a set of required applications of a second VCI, and obtaining constraints of the first VCI and constraints of the second VCI. The method also provides determining an application overlap between the set of required applications of the first VCI and the set of required applications of the second VCI, wherein the overlap complies with the constraints of the first VCI and the constraints of the second VCI, and placing applications of the application overlap into a first virtual disk file. The method further provides associating the first virtual disk file with the first virtual disk, and mounting the first virtual disk to the first VCI.

Further embodiments include a non-transitory computer-readable storage medium storing instructions that, when executed by a computer system, cause the computer system to perform the method set forth above, and a computer system programmed to carry out the method set forth above.

BRIEF DESCRIPTION OF THE DRAWINGS

FIGS. 3A-3G depict matrices showing exemplary virtual machine application overlaps and constraints, according to an embodiment.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 2:
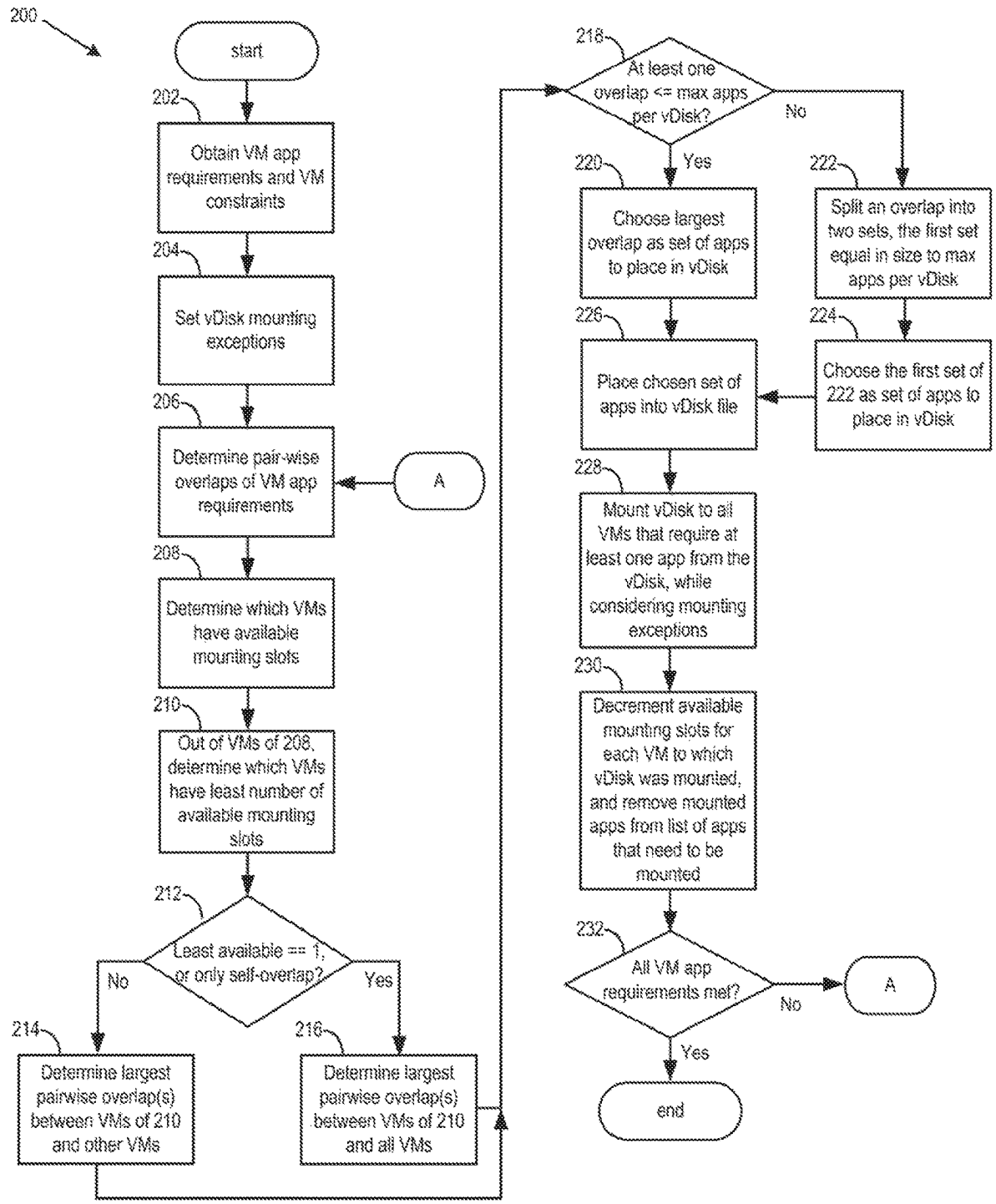
FIG. 2 depicts a flow diagram of a method of mounting a virtual disk to a virtual machine, according to an embodiment.

The disclosure provides techniques for attaching a virtual disk to a VM. The virtual disk is associated with a virtual disk file, the virtual disk file being partitioned into several partitions, with each partition containing a single application. The choice of how to place applications into virtual disk files to reduce burden on VMs while also meeting VM constraints on virtual disk attachment is explained with reference to FIG. 2, below. The approach discussed in FIG. 2 is advantageous because fewer mounted virtual disks results in a more efficient performance of a VM. The efficiency is improved at least in part because the VM has less virtual disks to manage. The efficiency is improved also because fewer mounted virtual disks lowers backlog of I/O requests to mounted virtual disks. VMs may have a limit on the number of storage input/output (I/O) operations the VM can handle within a period of time, so a limited number of virtual disks prevent backlogs of access requests to virtual storage. Better performance of VMs and VM virtual disks result in improved functionality of the computer itself, such as for example, by reduced swapping of memory pages between memory and storage. Fewer virtual disks mounted to a VM results in reduced login time and reduced application launch time.

Figure 1A:
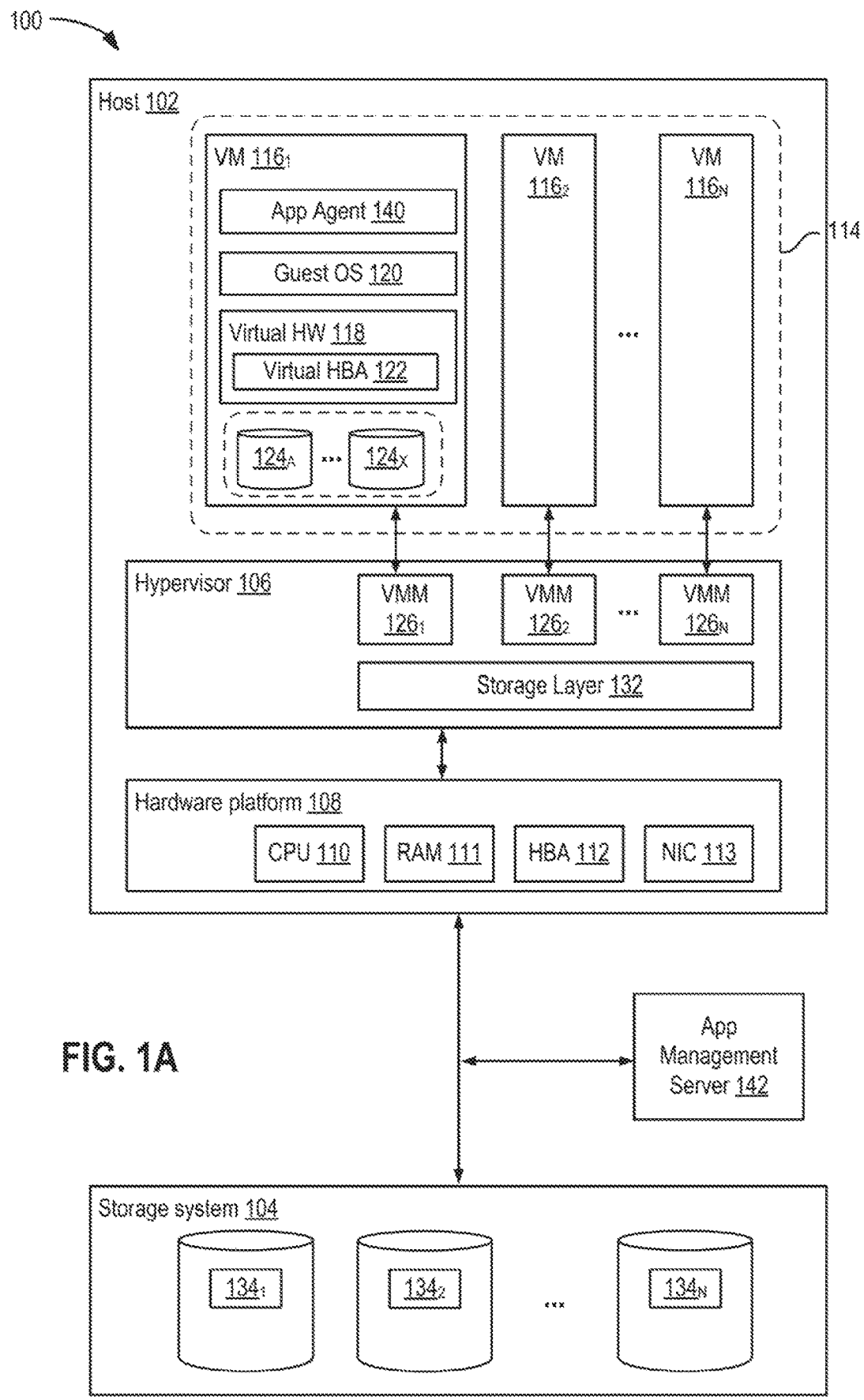
FIG. 1A depicts a block diagram of a computer system in which one or more embodiments of the present disclosure may be utilized.

FIG. 1A depicts a block diagram of a computer system 100 in which one or more embodiments of the present disclosure may be utilized. Computer system 100 includes one or more hosts 102 configured to provide a virtualization layer that abstracts processor, memory, storage, and networking resources of a hardware platform 108 into multiple virtual machines (VMs) 116 that run concurrently on the same host 102. Although this disclosure is described with reference to VM, the teachings herein also apply to other types of virtual computing instances (VCIs), such as containers, Docker containers (see, e.g., www.docker.com), data compute nodes, isolated user space instances, namespace containers, and the like.

VMs 116 run on top of a software interface layer, referred to as a hypervisor 106, which enables sharing of the hardware resources of host 102 by VMs 116. One example of hypervisor 106 is a VMware ESXi™ hypervisor provided as part of the VMware vSphere solution made commercially available from VMware, Inc. Although certain embodiments are described herein with respect to providing virtual application delivery to virtual machines, it should be noted that similar techniques may be used to provide virtual application delivery to other types of virtual computing instances or even physical computing devices. A user may access VM 116 directly via host 102, or may use remote services (e.g., remote desktop services) to access VM 116, or to access applications running on host 102 such as if host 102 is configured as a remote desktop service host.

Host 102 comprises a general purpose computer system having one or more VMs 116 accessing data stored on a storage system 104 connected via a network interface card (NIC) 113 to host 102. Host 102 may be constructed on a server-class hardware platform 108. Hardware platform 108 includes physical components of a computing device, such as a processor (CPU) 110, a memory 111, a disk interface 112, and NIC 113. Processor 110 is configured to execute instructions, for example, executable instructions that perform one or more operations described herein. The instructions may be stored in memory 111. Memory 111 and storage system 104 are devices allowing information, such as executable instructions, virtual disks, configurations, and other data, to be stored and retrieved. Memory 111 may include, for example, one or more random access memory (RAM) modules. Storage system 104 may include one or more locally attached storage devices, such as one or more hard disks, flash memory modules, solid state disks, and optical disks. In some embodiments, storage system 104 may include a shared storage system having one or more storage arrays of any type such as a network-attached storage (NAS) or a block-based device over a storage area network (SAN). Storage system 104 may be accessible by hosts 102 via a network. Disk interface 112, such as a host bus adapter (HBA), enables host 102 to communicate with storage system 104 to store virtual disks 134 that are accessed by VMs 116, as described later. Network interface 113 enables host 102 to communicate with another device via a communication medium, such as a network (not shown).

In an embodiment, storage system 104 is implemented as software-defined storage such as VMware vSAN™ made commercially available from VMware, Inc. Storage system 104 clusters together server-attached hard disks and/or solid state drives (HDDs and/or SSDs), to create a flash-optimized, highly resilient shared datastore designed for virtual environments.

While storage system 104 is typically made up of a plurality of disks, other forms of storage, such as solid-state non-volatile storage devices may be used, and the use of the term, "disk" herein, should therefore not be construed as limited only to rotating disk storage media, but may also be construed to encompass SSDs and other storage devices. In some embodiments, storage system 104 comprises high-density non-volatile memory. Further, while storage system 104 is depicted as a separate, external component to host 102, storage system 104 may be internal to host 102 as a local storage device or a locally attached storage.

As shown in FIG. 1A, hypervisor 106 is installed on top of hardware platform 108 and supports a virtual machine execution space 114 within which multiple VMs $116_1$-$116_N$ are instantiated and executed. Each VM $116_1$-$116_N$ implements a virtual hardware platform 118 that supports the installation of a guest operating system (OS) 120. Guest OS 120 is capable of executing one or more applications, including app agent 140, which may be installed on guest OS 120. Examples of guest OS 120 include any of the well-known commodity operating systems, such as Microsoft Windows, Linux, and the like. In each instance, guest OS 120 includes a native file system layer, such as new technology file system (NTFS) or an ext3 type file system layer. These file system layers interface with virtual hardware platforms 118 to access, from the perspective of guest OSs 120, a data storage HBA, which is virtual HBA 122 implemented by virtual hardware platform 118. Virtual hardware platform 118 provides the appearance of disk storage support to guest OS 120, and the disk storage support is provided through virtual disks $124_A$-$124_X$, which are mapped through hypervisor 106 to virtual disk files 134 on physical disks of storage system 104.

Virtual disk 124 exposes the same abstraction as a physical disk, that is, a linear list of sectors. However, a virtual machine monitor (VMM) may implement virtual disks 124 as files on host 102. From the perspective of guest OS 120, file system calls initiated by guest OS 120 appear to be routed to virtual disks $124_A$-$124_X$ for final execution, but such calls are processed and passed through virtual HBA 122, to VMM layers $126_1$-$126_N$, where the calls are translated into calls to virtual disk file 134 on storage system 104. HBA emulator of each VMM 126 functionally enables the data transfer and control operations to be correctly handled by hypervisor 106, which ultimately passes such operations through its various layers to true hardware HBAs 112 or NIC 113 that connect to storage system 104. That is, virtual disk 124 is a logical abstraction of a storage disk, the virtual disk 124 being implemented within VM 116. The virtual disk 124 is associated with a physical file present on storage system 104, and the physical file stores actual data that is associated with virtual disk 124. The physical file associated with virtual disk 124 is herein referred to as virtual disk file 134. Virtual disk 124 may be referred to as a "volume" or as an "app stack."

Hypervisor 106 includes a storage layer 132 configured to manage storage space persistently for VMs 116 via VMM layers $126_1$ to $126_N$. In one embodiment, storage layer 132 may include numerous logical layers, such as an I/O virtualization layer, a file system driver, and a disk access layer. In some embodiments, the I/O virtualization layer receives a data transfer and control operation, in the form of I/O commands intended for virtual disk 124, from VMM layers $126_1$ to $126_N$. The I/O virtualization layer converts the operations into file system operations that are understood by a virtual machine file system (VMFS) driver in order to access virtual disk file 134 stored in underlying storage system 104 under the management of the VMFS driver that represents virtual disk 124. The I/O virtualization layer issues these file system operations to the VMFS driver.

The VMFS driver, in general, manages creation, use, and deletion of virtual disk files 134 (e.g., .vmdk files representing virtual disks) stored on physical locations of storage system 104, or stored in logical volumes or Logical Unit Numbers (LUNs) exposed by storage system 104. The VMFS driver converts the file system operations received from the I/O virtualization layer to raw small computer system interface (SCSI) operations, which are issued to a data access layer that applies command queuing and scheduling policies to the raw SCSI operations and ultimately sends the raw SCSI operations to components of physical hardware platform 108. While storage layer 132 is depicted as part of a virtualized architecture, storage layer 132 may be part of other software modules. For example, in an embodiment, storage layer 132 is a file system driver of an OS that manages storage space persistently for locally attached storage.

Figure 1B:
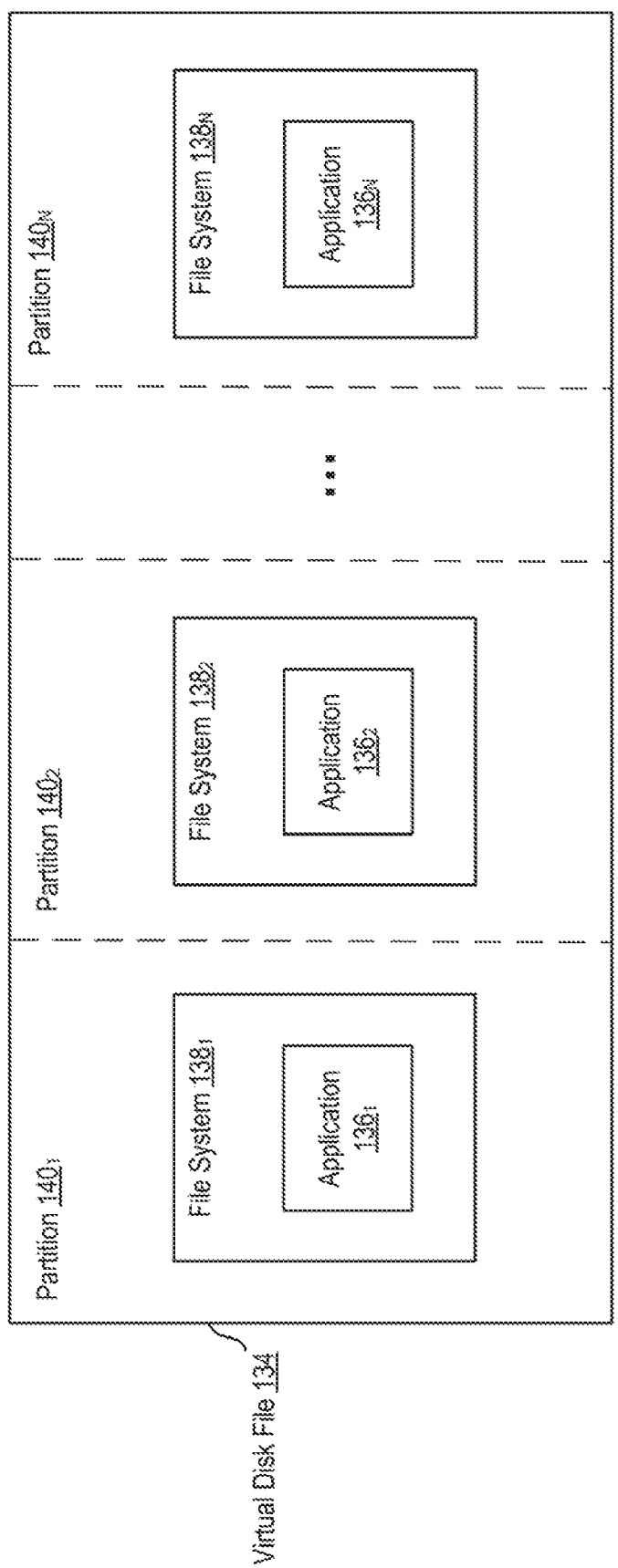
FIG. 1B depicts a block diagram of a virtual disk file, according to an embodiment.

FIG. 1B depicts a block diagram of virtual disk file 134, according to an embodiment. Storage system 104 stores virtual disk files 134. Virtual disk file 134 may be of the type .vmdk, .VHD, .HDD, .VDI, etc. Virtual disk file 134 is partitioned into several partitions 140. Each partition 140 contains application 136 and a file system 138 to organize files of application 136 and manage access to application 136. Virtual disk file 134 may be partitioned by any of the virtual disk partitioning methods known in the art, such as the master boot record (MBR) method and the globally unique identifiers (GUID) partition table (GPT) method. In an embodiment, each partition 140 contains no more than a single application 136.

Each application 136 contains all files (not shown) of application 136 needed by guest OS 120 to run application 136. Application 136 may contain a registry file, a folder containing service and library modules, and a folder containing data files. The registry file contains metadata on the files of application 136, such as file names, version number, etc. The service and library modules comprise logic and application programming interfaces (APIs) needed for application 136 to execute. Data files comprise data used by application 136 when executing, such as configuration data.

In the prior art, a virtual disk file had a single partition, and the single partition held files of all applications 136 within that virtual disk. That is, in the prior art, a single registry file contained metadata of all applications 136 on a virtual disk file. In the prior art, a single folder contained all service and library modules of all applications 136 on the virtual disk file. And in the prior art, a single folder contained all data files of all applications 136 on that virtual disk file. Intermixing files of applications 136 made it difficult to dynamically move applications 136 between virtual disk files as the state of computer system 100 changed. Separating files of each application 136 from files of other applications 136, as shown in FIG. 1B, is advantageous because the partitioning allows for quick and simple transfer of applications 136 between partitions 140 of virtual disk files 134. For example, application $136_1$ of virtual disk file $134_1$ may simply be copied and pasted from its partition $140_1$ into partition $140_2$ of virtual disk file $134_2$, without needing to separate files of application $136_1$ from other applications 136 on virtual disk file $134_1$. The moving of applications 136 onto and between virtual disk files 134 may be done dynamically while virtual disk 124 associated with virtual disk file 134 is mounted on VM 116. The moving of applications 136 onto virtual disk files 134 may also be performed while virtual disks 124 and their associated virtual disk files 134 are not mounted on VM 116.

Returning to FIG. 1A, VM 116 is configured to mount virtual disk files 134 as virtual disks 124 accessible by VM 116. VM 116 performs the mounting in conjunction with hypervisor 106. App agent 140 running on VM 116 is configured to run as a service on VM 116 and to use drivers, such as filter drivers to handle application calls to applications 136 and to handle file-system redirects to virtual disk file 134. In an embodiment, VM 116 has a limit as to the number of virtual disks 124 that can be mounted to VM 116. For example, the maximum number of virtual disks that can be mounted to VM 116 may be 1, 2, 10, 100, 1000, or 10,000.

For example, in order to mount virtual disk file 134 as a virtual disk 124, such as at logon time of the VM 116, app agent 140 communicates with an app management server 142 coupled to storage system 104 and host 102. App agent 140 determines which applications on virtual disk files 134 are assigned to VM 116 or to a user account accessing VM 116, such as by requesting such information from app management server 142. Assignment of VM 116 to virtual disk file 134 means that VM 116 has access rights to that virtual disk file 134. App management server 142 may then direct hypervisor 106 to mount the assigned virtual disk file 134 in VM 116.

App agent 140 uses information on virtual disk 124, such as configuration information for applications 136, middleware, and/or data files, to make applications stored on virtual disk 124 available to VM 116. App agent 140 redirects calls to applications 136 to virtual disk 124. Virtual disk 124 representing virtual disk file 134 may be mounted as a single read-only volume on VM 116. Mounting as read-only avoids write conflicts between multiple computing devices, because the same virtual disk file 134 may be mounted by multiple computing devices.

FIG. 2 depicts a flow diagram of a method 200 of mounting virtual disk 124 to VM 116, according to an embodiment. Method 200 may be performed by hypervisor 106 in conjunction with other hypervisors 106 on remote hosts 102, or by another software module with access to information needed for performing method 200. In certain embodiments, method 200 may be performed by app management server 142 of a data center in which a plurality of hosts 102 are located. App management server 142 may be a virtual computing instance running within one of hosts 102, or may be a separate software module or physical device. For illustration purposes, method 200 will be described as performed by app management server 142.

At block 202, app management server 142 accesses information as to what applications 136 are required by each of VMs 116 within one of hosts 102, such as by requesting the information from hypervisor 106 of that host 102. App management server 142 also accesses information on constraints on each of VMs 116, such as the maximum number of virtual disks 124 that can be mounted to a particular VM 116, and such as the maximum number of applications 136 that can be placed within a single virtual disk 124 on a particular VM 116. As used herein, a VM "constraint" is a limitation or restriction on the resources that are available to VM 116, on the number or size of resources that can be connected to VM 116, or on the functionalities that can be performed by a VM 116. The constraint information may be maintained and managed by hypervisor 106, and may be stored on storage system 104. If app management server 142 is taking into account application requirements of VM 116 in a remote host 102, then app management server 142 communicates with remote hypervisors 106 of remote hosts 102 to obtain application requirement information of remote hosts 102.

At block 204, app management server 142 obtains mounting exception rules for mounting virtual disk 124 to VMs 116. Mounting exception rules may be located on storage system 104, and may be created by an administrator or automatically by a software module in response to conditions within computer system 100. For an example of a mounting exception, virtual disk 124 might not be mounted to VM 116 if virtual disk 124 contains some applications 136 needed by VM 116, but also contains many applications 136 that are not needed by VM 116. The applications 136 that are not needed by VM 116 may result in a large virtual disk 124 being mounted to VM 116, slowing down performance of VM 116 because of the additional burden of managing extraneous applications on mounted virtual disk 124. A threshold value may be obtained by app management server 142 as to the maximum difference or ratio between applications 136 within virtual disk 124 needed and unneeded by VM 116, for virtual disk 124 to be eligible for mounting to VM 116.

At block 206, app management server 142 determines overlaps between each pair of VM 116 out of the group of VMs 116 that are being considered for method 200. That is, app management server 142 determines what application requirements each pair of VM 116 have in common. This relationship can be illustrated with a matrix, such as that shown in FIG. 3A.

As used herein, an "overlap" is a set of applications that (a) are required by both of two VMs 116, and (b) have not yet been mounted to one of the two VMs. The two VMs can be the same VM being compared to itself, in which case an overlap is referred to herein as a "self-overlap." For example, if a first VM requires applications 1, 2, and 3 while a second VM requires applications 2, 3, and 4, and none of these applications have been mounted to either VM, then the "overlap" is applications 2 and 3, because applications 2 and 3 are required by both first and second VM. The self-overlap of the first exemplary VM is 1, 2, and 3, because a VM's self-overlap consists of all of its required applications that have not yet been mounted to that VM. An "overlap" is sometimes referred to herein as a "pair-wise" overlap, which is to emphasize that the overlap is determined between a pair of VMs, although the pair can consist of a VM and itself. As used herein, an "application overlap" is synonymous with "overlap."

FIG. 3A depicts a matrix showing exemplary VM application overlaps and constraints, according to an embodiment. FIG. 3A shows information for five exemplary VMs 116₁-116₅, with a row for each VM 116, as shown in rows two through six of FIG. 3A. FIG. 3A shows exemplary constraints on each VM 116. Exemplary VM 116₁ is able to mount a maximum of two virtual disks 124, as shown by column three, row two of FIG. 3A. VM 116₁ is able to mount virtual disks 124 that have up to three applications 136 within the virtual disk file 134 of virtual disk 124, as shown by column two, row two of FIG. 3A. VM 116₁ requires four applications to be accessible by VM 116₁, as shown by column four, row two of FIG. 3A. The four applications required by VM 116₁ have application IDs of 1, 4, 5, and 6. Application IDs may correspond to software applications. For example, application ID 1 may correspond to Microsoft Word, and application ID 4 may correspond to Adobe Acrobat Reader. It should be noted that the exemplary values shown in FIG. 3A are for illustration only, and may be magnitudes larger than the ones shown. For example, maximum applications 136 allowed per virtual disk may be approximately 10, 100, or over 1000. Similarly, the maximum mounting slots that VM 116 has available may be approximately 10, 100, or over 1000.

Returning to block 206 of method 200, the overlap of application requirements by VMs 116 can be illustrated by a matrix, such as columns four to nine of FIG. 3A. Column 4 contains application IDs of applications 136 required by each of VMs 116₁-116₅. The headers of columns five to nine (row one, elements five to nine) are a transposition of the elements of column four. That is, the elements of column four are repeated exactly but in row form in the top (first) row of FIG. 3A.

FIG. 3A allows for visualization of pair-wise overlap between application requirements of VMs 116. As shown in FIG. 3A, VM 116₁ overlaps with VM 116₃ by two applications, 4 and 5. This overlap is shown in row two, column seven of FIG. 3A. VM 116₂ overlaps with VM 116₅ by three applications, 0, 2, 9, as shown by row three, column nine of FIG. 3A. FIG. 3A also shows "self-overlap," such as overlap between VM 116₂ and VM 116₂ in row three, column six, and the self-overlap of VM 116₃ in row four, column 7. The series of entries representing self-overlaps can be referred to as the "diagonal" of FIG. 3A. The bottom-left half of FIG. 3A can remain blank, because filling in those entries would be repetitious of the top-right half of FIG. 3A.

At block 208, app management server 142 determines which VMs 116 have available mounting slots. Following the example of FIG. 3A, all exemplary VMs 116₁-116₅ have available mounting slots, as shown by column three. Optionally, at block 208, app management server 142 checks whether any VMs 116 that have no available mounting slots have had their application requirements met by the mounting of virtual disk 124 associated with required applications 136. If VM 116 has no mounting slots but applications 136 need to be provided to VM 116, then app management server 142 may send an alert to an administrator for manual mounting.

At block 210, app management server 142 takes note of the VMs 116 identified in block 208 as having available mounting slots, and out of these VMs 116, hypervisor 116 determines which VM(s) 116 have the least number of available mounting slots. Following the above example, VMs 116₁, 116₃, and 116₄ have two available mounting slots, while the rest of VMs 116 have more than two mounting slots.

At block 212, app management server 142 determines whether the least number of available mounting slots determined at block 210 is one. If so, then method 200 proceeds to block 216. If not, then method 200 proceeds to block 214. Following the above example, the least number of available mounting slots was two, so method 200 proceeds to block 214.

At block 214, app management server 142 determines the largest pairwise overlap(s) between VMs 116 of block 210 and other VMs 116. Self-overlap, as shown by entries in the diagonal of FIG. 3A, is not considered for the determination at block 214. In determining the largest pair-wise overlaps, app management server 142 also checks that the number of applications 136 in each overlap is less than or equal to a constraint on both VMs 116 of the overlaps, the constraint being the maximum number of applications per virtual disk 124 allowed by that VM 116. At block 214, multiple different overlaps of equal size may be determined to be "largest" for the purposes of subsequent blocks.

Following the above example, the VMs of block 210 were VMs 116₁, 116₃, and 116₄. The largest overlap of VM 116₁ is applications 4 and 5, the overlap being with VM 116₃. This overlap, consisting of applications 4 and 5, has a size of two, which is less than or equal to the maximum applications 136 per virtual disk 124 allowed by both VM 116₁ and VM 116₃, as shown in row two, column two and in row three, column two of FIG. 3A, respectively. The largest overlap of VM 116₃ is applications 7, 8, and 9, the overlap being with VM 116₅, and the three applications in this overlap is a quantity that is less than or equal to the three applications 136 per virtual disk 124 allowed for VMs 116₃ and 116₅. The largest overlap of 116₄ is applications 8 and 9, the overlap being with VM 116₅, and the two applications in this overlap is a quantity that is less than or equal to the three applications 136 per virtual disk 124 allowed for VMs 116₄ and 116₅. Out of these three overlaps, overlap of VM 116₃ with VM 116₅ is largest, consisting of three applications 7, 8, and 9. The overlap consisting of applications 7, 8, and 9 is the largest because it has three applications, while the remaining two overlaps have two applications. Only one overlap with size three exists, so only one overlap is considered for subsequent blocks of method 200 in illustrating the example.

At block 216, app management server 142 determines the largest pairwise overlap(s) between VMs 116 of block 210 and all VMs 116. In determining the largest pair-wise overlap(s), app management server 142 also checks that the number of applications 136 in each overlap is less than or equal to a constraint on both VMs 116 of the overlap. Self-overlap, as shown by entries in the diagonal of FIG. 3A, is considered for the determination at block 216. The difference between blocks 214 and 216 is that in block 214, self-overlap is not considered, while in block 216, self-overlap is considered. Block 216 is reached if the VM(s) identified at block 210 only has a single available mounting slot. If only a single mounting slot is available at VM 116, then the rest of required applications 136 for that VM 116 need to be mounted to that VM 116. Thus, app management server 142 looks at least to the requirements of that VM 116 to determine which applications 136 should be mounted. To make sure that required applications of VM 116 with a single remaining mounting slot are considered, self-overlap—such as that shown by the diagonal of FIG. 3A—is considered. At block 216, multiple different overlaps of equal size may be determined to be "largest" for the purposes of subsequent blocks.

At block 218, app management server 142 checks that at least one overlap between VMs 116 met the maximum applications per virtual disk constraint, as applied during block 214 or block 216. If so, then the method proceeds to block 220. If not, then method 200 proceeds to block 222.

At block 220, app management server 142 chooses applications 136 of the overlap(s) determined at block 214 or block 216 for placement within virtual disk file 134. In an embodiment, virtual disk file 134 containing applications 136 of each overlap of block 214 or each overlap of block 216 contains no applications 136 except those of the single overlap. Following the above example, app management server 142 chooses the overlap consisting of applications 7, 8, and 9 for placement into virtual disk file 134, and virtual disk file 134 will contain no other applications 136 except applications 136 with IDs 7, 8, and 9.

At block 222, app management server 142 splits an overlap into two sets, the first set containing a number of applications equal in size to a maximum applications per virtual disk allowed by the two VMs 116 of the overlap, and a second set containing the remaining application 136 of the overlap. In another embodiment, app management server 142 splits an overlap into multiple sets, the first set containing a number of applications equal in size to a maximum applications per virtual disk allowed by the two VMs 116 of the overlap, and multiple other sets, as required to meet the maximum applications per virtual disk requirement of the two VMs of the overlap.

Block 222 is reached if all overlaps considered at block 214 or 216 contained more applications than allowed per virtual disk by any pair of VMs 116, wherein a "pair" can be a pairing of VM 116 with itself, for a pair-wise self-overlap as would be shown within a diagonal of FIG. 3A. Because all overlaps considered at block 214 or 216 contained too many applications 136 to be placed into virtual disk file 134, an overlap must be split into two or more overlaps. At block 224, app management server 142 chooses the first set for placement into virtual disk file 134. In another embodiment, at block 224, app management server 142 chooses both or all sets for placement into virtual disk file 134.

At block 226, app management server 142 places applications 136 of each overlap chosen at block 220 or block 224 within virtual disk file(s) 134. One separate virtual disk file 134 is provided for each overlap. That is, if two different overlaps of equal size are determined to be largest at block 214 or 216, then app management server 142 places applications 136 of the first overlap into a first virtual file disk 134, and app management server 142 places applications 136 of the second overlap into a second virtual disk file 134. App management server 142 places each application 136 into its own partition of virtual disk file 134, as discussed above with reference to FIG. 1A. Continuing the above example, app management server 142 places application 136 with ID 7 into its own partition 140 (e.g., partition $140_1$) of virtual disk file 134. App management server 142 places application 136 with ID 8 into its own partition 140 (e.g., partition $140_2$) of virtual disk file 134. And app management server 142 places application 136 with ID 8 into its own partition 140 (e.g., partition $140_3$) of virtual disk file 134.

At block 228, while considering exceptions of block 204, app management server 142 mounts virtual disk file 134 to all VMs 116 that require at least one application 136 contained within virtual disk file 134, and that at least one application 136 has not yet been mounted to VM 116 that requires the at least one application 136. Virtual disk file 134 is mounted to VM 116 by creating virtual disk 124 within VM 116 and associating virtual disk 124 with virtual disk file 134. App management server 142 mounts virtual disk file 134 to at least two VMs 116 of each pair-wise overlap that was chosen at block 220 or block 224.

Following the above example, VMs $116_2$, $116_3$, $116_4$, and $116_5$ require at least one of applications 7, 8, or 9 that were chosen at block 220. App management server 142 places application 7 into a partition of virtual disk file 134, application 8 into a second separate partition of virtual disk file 134, and application 9 into a third separate partition of virtual disk file 134. Before mounting virtual disk file 134 to VMs 116, hypervisor considers exceptions. Virtual disk file 134 contains three application, but only one of them is required by VM $116_2$. For illustration purposes only, in this example, we will assume that an exception rule exists in which a threshold ratio between (a) number of required applications 136 contained within a virtual disk file 134 and (b) number of total applications contained within a virtual disk file 134, is one-half or more. Here, the ratio between one needed application 136 and three total applications 136 is one-third for VM $116_2$, which is smaller than one-half, and so virtual disk file 134 will not be mounted to VM $116_2$. However, in our example, app management server 142 mounts virtual disk file 134 to VMs $116_3$, $116_4$, and $116s$.

At block 230, app management server 142 decrements available mounting slots for each VM 116 to which a virtual disk file 134 was mounted. App management server 142 also removes mounted applications, for each VM 116 to which virtual disk file 134 was mounted, from that VM's list of applications that are still to be mounted.

Continuing the above example, lists of applications that still need to be mounted on each VM 116 are shown in column four of FIG. 3A. App management server 142 decrements the number of available mounting slots from VMs $116_3$, $116_4$, and $116_5$. App management server 142 removes applications 7, 8, and 9 from a list of applications that need to be mounted to VM $116_3$ and VM $116_5$. App management server 142 also removes applications 8 and 9 from a list of applications that need to be mounted to VM $116_4$.

At block 232, app management server 142 determines whether all VMs 116 have had their required applications 136 mounted. If so, method 200 ends. If not, method 200 returns to block 206, where the values of FIG. 3A are recalculated. Continuing the above example, not all VMs $116i$-$116s$ have had their required applications 136 mounted, so method 200 returns to block 206. After execution of block 206, recalculated FIG. 3A will have the values shown in FIG. 3B. The last column of FIG. 3B shows that virtual disk file 134 containing applications 7, 8, and 9 will be mounted to VMs $116_3$, $116_4$, and $116_5$.

In order to conclude the above example, method 200 must go through several more iterations. FIGS. 3B-3G depict a series of matrices, each matrix showing the state of VMs $116i$-$116s$ after values of the matrix have been recalculated at the completion of block 230.

After applications 136 are assigned to virtual disks 124 and associated virtual disk files 134, applications 136 can be dynamically moved/transferred between virtual disk files 134 in order to react to changing required applications of VMs 116. As discussed above, application 136 can be moved between virtual disk files 134 by transferring application 136 from one partition 140 of a first virtual disk file 134 into an available partition 140 of a second virtual disk file 134. Then VM 116, in conjunction with app management server 142, updates virtual disk 124 of each virtual disk file 134 to reflect the added or deleted application 136.

It should be understood that, for any process described herein, there may be additional or fewer steps performed in similar or alternative orders, or in parallel, within the scope of the various embodiments, consistent with the teachings herein, unless otherwise stated.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, application specific integrated circuits (ASIC s), field-programmable gate arrays (FPGAs), and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in userspace on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O. The term "virtualized computing instance" as used herein is meant to encompass both VMs and OS-less containers.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

What is claimed is:

1. A method of mounting a first virtual disk to a first virtual machine (VM), the method comprising:
    obtaining a set of required applications of the first VM and a set of required applications of a second VM;
    obtaining constraints of the first VM and constraints of the second VM, wherein the first VM is different than the second VM, wherein constraints of the first VM include a first maximum number of applications per virtual disk of the first VM, wherein constraints of the second VM include a second maximum number of applications per virtual disk of the second VM, wherein the first maximum number of applications is different than the second maximum number of applications;
    determining an application overlap between the set of required applications of the first VM and the set of required applications of the second VM, wherein the application overlap complies with the constraints of the first VM and the constraints of the second VM;
    placing applications of the application overlap into a first virtual disk file; and
    mounting the first virtual disk file to the first VM as the first virtual disk.

2. The method of claim 1, wherein the constraints of the first VM include a number of available virtual disk mounting slots on the first VM.

3. The method of claim 1, wherein the first VM and the second VM are constituents of a set of VMs, wherein determining the application overlap comprises:
    determining which VMs of the set of VMs have the least number of available virtual disk mounting slots; and
    for the VMs that have the least number of available virtual disk mounting slots, determining at least one largest pair-wise overlap.

4. The method of claim 1, further comprising:
    splitting applications of the application overlap into at least a first set of applications and a second set of applications, the first set being equal in number to the smaller of the first maximum number and the second maximum number; and
    choosing applications of the first set as applications to be placed into the first virtual disk file.

5. The method of claim 1, further comprising transferring an application from a partition of the first virtual disk file to a partition of a second virtual disk file, and updating the first virtual disk to reflect deletion of the application from the partition of the first virtual disk file.

6. The method of claim 1, wherein the placing applications comprises placing each application into a separate partition of the first virtual disk file.

7. The method of claim 6, wherein each separate partition containing an application comprises a file system separate from file systems of other partitions of the first virtual disk file.

8. The method of claim 1, further comprising:
    prior to mounting the first virtual disk to the first VM, determining whether a ratio of a number of the set of required applications of the first VM that are contained within the first virtual disk to a total number of applications contained within the first virtual disk satisfies a threshold, wherein mounting the first virtual disk to the first VM is performed based on the ratio satisfying the threshold.

9. A non-transitory computer readable medium comprising instructions to be executed in a processor of a computer system, the instructions when executed in the processor cause the computer system to carry out a method of mounting a first virtual disk to a first virtual machine (VM), the method comprising:
    obtaining a set of required applications of the first VM and a set of required applications of a second VM;
    obtaining constraints of the first VM and constraints of the second VM, wherein the first VM is different than the second VM wherein constraints of the first VM include a first maximum number of applications pr virtual disk of the first VM wherein constraints of the second VM include a second maximum number of applications per virtual disk of the second VM, wherein the first maximum number of applications is different than the second maximum number of applications;
    determining an application overlap between the set of required applications of the first VM and the set of required applications of the second VM, wherein the overlap complies with the constraints of the first VM and the constraints of the second VM;
    placing applications of the application overlap into a first virtual disk file; and
    mounting the first virtual disk file to the first VM as the first virtual disk.

10. The non-transitory computer readable medium of claim 9, wherein the constraints of the first VM include a number of available virtual disk mounting slots on the first VM.

11. The non-transitory computer readable medium of claim 9, wherein the first VM and the second VM are constituents of a set of VMs, wherein determining the application overlap comprises:
    determining which VMs of the set of VMs have the least number of available virtual disk mounting slots; and
    for the VMs that have the least number of available virtual disk mounting slots, determining at least one largest pair-wise overlap.

12. The non-transitory computer readable medium of claim 9, the method further comprising:
    splitting applications of the application overlap into at least a first set of applications and a second set of applications, the first set being equal in number to the smaller of the first maximum number and the second maximum number; and
    choosing applications of the first set as applications to be placed into the first virtual disk file.

13. The non-transitory computer readable medium of claim 9, the method further comprising transferring an application from a partition of the first virtual disk file to a partition of a second virtual disk file, and updating the first virtual disk to reflect deletion of the application from the partition of the first virtual disk file.

14. The non-transitory computer readable medium of claim 9, wherein the placing applications comprises placing each application into a separate partition of the first virtual disk file.

15. The non-transitory computer readable medium of claim 14, wherein each separate partition containing an application comprises a file system separate from file systems of other partitions of the first virtual disk file.

16. A computer system comprising:
a first virtual computing instance (VCI) and a second VCI;
a first virtual disk and a first virtual disk file; and
a processor, wherein the processor is programmed to carry out a method of mounting the first virtual disk to the first VCI, the method comprising:
obtaining a set of required applications of the first VCI and a set of required applications of the second VCI;
obtaining constraints of the first VCI and constraints of the second VCI, wherein the first VCI is different than the second VCI, wherein constraints of the first VCI include a first maximum number of applications per virtual disk of the first VCI, wherein constraints of the second VCI include a second maximum number of applications per virtual disk of the second VCI wherein the first maximum number of applications is different than the second maximum number of applications;
determining an application overlap between the set of required applications of the first VCI and the set of required applications of the second VCI, wherein the overlap complies with the constraints of the first VCI and the constraints of the second VCI;
placing applications of the application overlap into the first virtual disk file; and
mounting the first virtual disk file to the first VCI as the first virtual disk.

17. The computer system of claim 16, wherein the constraints of the first VCI include a number of available virtual disk mounting slots on the first VCI.

18. The computer system of claim 16, wherein the first VCI and the second VCI are constituents of a set of VCIs, wherein determining the application overlap comprises:
determining which VCIs of the set of VCIs have the least number of available virtual disk mounting slots; and
for the VCIs that have the least number of available virtual disk mounting slots, determining at least one largest pair-wise overlap.

19. The computer system of claim 16, the method further comprising:
splitting applications of the application overlap into at least a first set of applications and a second set of applications, the first set being equal in number to the smaller of the first maximum number and the second maximum number; and
choosing applications of the first set as applications to be placed into the first virtual disk file.

20. The computer system of claim 16, wherein the placing applications comprises placing each application into a separate partition of the first virtual disk file.

21. The computer system of claim 20, wherein each separate partition containing an application comprises a file system separate from file systems of other partitions of the first virtual disk file.

* * * * *